(12) United States Patent
Rabe et al.

(10) Patent No.: US 11,464,244 B2
(45) Date of Patent: *Oct. 11, 2022

(54) FEEDSTUFF OF HIGH ABRASION RESISTANCE AND GOOD STABILITY IN WATER, CONTAINING PUFAS

(71) Applicant: Evonik Operations GmbH, Essen (DE)

(72) Inventors: Christian Rabe, Grossostheim (DE); Amelia Claudia Silva, Hanau (DE); Stefan Eils, Gründau (DE); Horst Priefert, Ostbevern (DE)

(73) Assignee: Evonik Operations GmbH, Essen (DE)

( * ) Notice: Subject to any disclaimer, the term of this patent is extended or adjusted under 35 U.S.C. 154(b) by 470 days.

This patent is subject to a terminal disclaimer.

(21) Appl. No.: 15/516,022

(22) PCT Filed: Sep. 22, 2015

(86) PCT No.: PCT/EP2015/071666
§ 371 (c)(1),
(2) Date: Mar. 31, 2017

(87) PCT Pub. No.: WO2016/050554
PCT Pub. Date: Apr. 7, 2016

(65) Prior Publication Data
US 2017/0295823 A1    Oct. 19, 2017

(30) Foreign Application Priority Data

Oct. 2, 2014   (EP) .................................. 14187485

(51) Int. Cl.
| A23K 20/158 | (2016.01) |
| A23K 10/12 | (2016.01) |
| A23K 10/16 | (2016.01) |
| A23K 40/30 | (2016.01) |
| A23K 50/80 | (2016.01) |
| A23K 40/25 | (2016.01) |
| A23K 20/163 | (2016.01) |

(52) U.S. Cl.
CPC ............ *A23K 20/158* (2016.05); *A23K 10/12* (2016.05); *A23K 10/16* (2016.05); *A23K 20/163* (2016.05); *A23K 40/25* (2016.05); *A23K 40/30* (2016.05); *A23K 50/80* (2016.05); *Y02A 40/818* (2018.01)

(58) Field of Classification Search
CPC ........ A23K 10/16; A23K 10/18; A23K 50/80; A23K 20/158; A23K 40/25; A23K 10/12
See application file for complete search history.

(56) References Cited

U.S. PATENT DOCUMENTS

| 2,123,134 A | 7/1938 | Cowgill |
| 2,177,031 A | 10/1939 | Tanner |
| 2,513,369 A | 7/1950 | Shaw |
| 3,257,737 A | 6/1966 | Thomas |
| 3,257,738 A | 6/1966 | Margittai et al. |
| 3,437,489 A | 4/1969 | Seiji et al. |
| 3,773,527 A | 11/1973 | Ruggerone |
| 3,920,815 A | 11/1975 | Harvey et al. |
| 4,160,040 A | 7/1979 | Luca et al. |
| 4,209,538 A | 6/1980 | Woodruff |
| 4,228,197 A | 10/1980 | Means |
| 4,335,150 A | 6/1982 | Hosaka et al. |
| 4,592,762 A | 6/1986 | Babu et al. |
| 4,683,139 A | 7/1987 | Cheng |
| 5,113,597 A | 5/1992 | Sylla |
| 5,130,242 A | 7/1992 | Barclay |
| 5,298,271 A | 3/1994 | Takashina et al. |
| 5,340,594 A | 8/1994 | Barclay |
| 5,340,742 A | 8/1994 | Barclay |
| 5,434,183 A | 7/1995 | Larsson-Backstrom |
| 5,518,918 A | 5/1996 | Barclay |
| 5,567,732 A | 10/1996 | Kyle et al. |
| 5,574,065 A | 11/1996 | Trimbo |
| 5,622,710 A | 4/1997 | Binder et al. |
| 5,656,319 A | 8/1997 | Barclay |
| 5,698,244 A | 12/1997 | Barclay |
| 5,700,506 A | 12/1997 | Mudahar |
| 5,700,837 A | 12/1997 | Trimbo |
| 5,840,358 A | 11/1998 | Hofler et al. |
| 6,068,874 A | 5/2000 | Grocholski |
| 6,117,905 A | 9/2000 | Higashiyama et al. |
| 6,158,147 A | 12/2000 | Smith et al. |
| 6,166,230 A | 12/2000 | Bijl et al. |

(Continued)

FOREIGN PATENT DOCUMENTS

| AU | 771 809 B2 | 6/2001 |
| CH | 646 729 | 12/1984 |

(Continued)

OTHER PUBLICATIONS

Bouvier et al., Aquafeed Twin Screw Extrusion Processing, Clextral Group, Firminy, France, 2006, p. 76-94. (Year: 2006).*
Non Final Office Action for copending U.S. Appl. No. 15/516,044, dated Mar. 27, 2019.
Response to Restriction Requirement filed Jul. 5, 2019, for copending U.S. Appl. No. 15/516,023.
Office Action dated Aug. 6, 2019 for copending U.S. Appl. No. 15/516,023.
Response to Office Action filed Aug. 10, 2019 for copending U.S. Appl. No. 15/516,044.
Office Action dated Aug. 16, 2019 for copending U.S. Appl. No. 15/516,024.
Chang, K.J.L., "New Australian thraustochytrids: A Renewable Source of Biofuels, Omega-3 Oils and other Bioproducts," Thesis; University of Tasmania; (Aug. 2013).

(Continued)

*Primary Examiner* — Walter A Moore
(74) *Attorney, Agent, or Firm* — Law Office of Michael A. Sanzo, LLC

(57) ABSTRACT

According to the invention, it was found that, surprisingly, a feedstuff having a very high abrasion resistance and very high water stability can be obtained when a PUFA-containing biomass having a high sulphate content is used for producing the feedstuff.

21 Claims, No Drawings

(56) References Cited

U.S. PATENT DOCUMENTS

| | | |
|---|---|---|
| 6,248,909 B1 | 6/2001 | Akimoto et al. |
| 6,255,505 B1 | 7/2001 | Bijl et al. |
| 6,326,037 B1 | 12/2001 | Mann et al. |
| 6,372,460 B1 | 4/2002 | Gladue et al. |
| 6,410,281 B1 | 6/2002 | Barclay |
| 6,441,208 B2 | 8/2002 | Bijl et al. |
| 6,451,567 B1 | 9/2002 | Barclay |
| 6,602,690 B2 | 8/2003 | Kawashima et al. |
| 6,607,900 B2 | 8/2003 | Bailey et al. |
| 6,727,373 B2 | 4/2004 | Bijl et al. |
| 6,812,009 B2 | 11/2004 | Gladue et al. |
| 6,977,167 B2 | 12/2005 | Barclay |
| 7,067,145 B2 | 6/2006 | Place et al. |
| 7,259,006 B2 | 8/2007 | Komazawa et al. |
| 7,381,558 B2 | 6/2008 | Barclay |
| 7,470,527 B2 | 12/2008 | Streekstra et al. |
| 7,514,096 B2 | 4/2009 | Haraldsson et al. |
| 7,514,244 B2 | 4/2009 | Tanaka et al. |
| 7,579,174 B2 | 8/2009 | Bailey et al. |
| 7,709,236 B2 | 5/2010 | Akimoto et al. |
| 7,723,386 B2 | 5/2010 | Akimoto et al. |
| 7,732,170 B2 | 6/2010 | Bailey et al. |
| 7,847,113 B2 | 12/2010 | Kawashima et al. |
| 7,863,026 B2 | 1/2011 | Komazawa et al. |
| 7,910,604 B2 | 3/2011 | Vasquez-Anon et al. |
| 7,935,365 B2 | 5/2011 | Dror et al. |
| 8,030,348 B2 | 10/2011 | Sampalis |
| 8,052,992 B2 | 11/2011 | Dror et al. |
| 8,124,384 B2 | 2/2012 | Bailey et al. |
| 8,124,385 B2 | 2/2012 | Bailey et al. |
| 8,129,172 B2 | 3/2012 | Barclay |
| 8,143,310 B2 | 3/2012 | Wang |
| 8,163,515 B2 | 4/2012 | Burja et al. |
| 8,187,846 B2 | 5/2012 | Bailey et al. |
| 8,207,363 B2 | 6/2012 | Apt et al. |
| 8,216,812 B2 | 7/2012 | Bailey et al. |
| 8,217,151 B2 | 7/2012 | Schaap et al. |
| 8,232,090 B2 | 7/2012 | Kallenmareth |
| 8,236,854 B2 | 8/2012 | Akimoto et al. |
| 8,241,868 B2 | 8/2012 | Higashiyama et al. |
| 8,278,351 B2 | 10/2012 | Sampalis |
| 8,288,133 B2 | 10/2012 | Bailey et al. |
| 8,288,134 B2 | 10/2012 | Bailey et al. |
| 8,334,363 B2 | 12/2012 | Hurd et al. |
| 8,343,753 B2 | 1/2013 | Chilton et al. |
| 8,367,774 B2 | 2/2013 | Frank |
| 8,420,349 B2 | 4/2013 | Kralovec et al. |
| 8,900,831 B2 | 12/2014 | Rusing et al. |
| 8,921,069 B2 | 12/2014 | Burja |
| 8,945,886 B2 | 2/2015 | Katano et al. |
| 8,999,663 B2 | 4/2015 | Avgousti et al. |
| 9,045,785 B2 | 6/2015 | Pfeifer et al. |
| 9,072,311 B2 | 7/2015 | Harel et al. |
| 9,101,151 B2 | 8/2015 | Kobzeff et al. |
| 9,414,612 B2 | 8/2016 | Apt et al. |
| 9,493,798 B2 | 11/2016 | Higashiyama et al. |
| 9,649,609 B2 | 5/2017 | Alt et al. |
| 9,848,623 B2 | 12/2017 | Bailey et al. |
| 10,531,679 B2 | 1/2020 | Rudinger et al. |
| 10,619,175 B2 | 4/2020 | Rabe |
| 10,842,174 B2 | 11/2020 | Durhuus |
| 2002/0110582 A1 | 8/2002 | Place et al. |
| 2003/0143659 A1 | 7/2003 | Bijl et al. |
| 2003/0170371 A1* | 9/2003 | Jobe ................. A23K 40/20 426/635 |
| 2005/0118208 A1 | 6/2005 | Bewert |
| 2005/0129739 A1 | 6/2005 | Kohn et al. |
| 2005/0202148 A1 | 9/2005 | Streekstra et al. |
| 2005/0287263 A1 | 12/2005 | Mayer |
| 2006/0051484 A1 | 3/2006 | Yamaguchi et al. |
| 2006/0068019 A1 | 3/2006 | Daiziel |
| 2006/0094089 A1 | 5/2006 | Barclay |
| 2006/0127531 A1* | 6/2006 | Jobe ................. A23K 40/25 426/2 |
| 2006/0160203 A1 | 7/2006 | Barclay |
| 2006/0188969 A1 | 8/2006 | Barclay |
| 2006/0265766 A1 | 11/2006 | Kyle et al. |
| 2006/0286205 A1 | 12/2006 | Fichtali et al. |
| 2007/0032383 A1 | 2/2007 | Newell |
| 2007/0082008 A1 | 4/2007 | Harel et al. |
| 2007/0092955 A1 | 4/2007 | De Laat et al. |
| 2007/0172540 A1* | 7/2007 | Neece ................. A23K 40/10 426/2 |
| 2007/0243307 A1 | 10/2007 | Abril et al. |
| 2007/0244192 A1 | 10/2007 | Metz |
| 2007/0248738 A1 | 10/2007 | Abril et al. |
| 2007/0248739 A1 | 10/2007 | Abril et al. |
| 2008/0026128 A1 | 1/2008 | Yamaguchi et al. |
| 2008/0032381 A1 | 2/2008 | Bailey et al. |
| 2008/0038800 A1 | 2/2008 | Ruecker et al. |
| 2008/0096964 A1 | 4/2008 | Subramanian et al. |
| 2008/0166780 A1 | 7/2008 | Barclay |
| 2008/0199923 A1 | 8/2008 | Barclay |
| 2008/0254177 A1 | 10/2008 | Lin et al. |
| 2009/0004219 A1 | 1/2009 | Kallenmareth |
| 2009/0053342 A1 | 2/2009 | Streekstra et al. |
| 2009/0064567 A1 | 3/2009 | Lippmeier et al. |
| 2009/0136637 A1 | 5/2009 | Janssen et al. |
| 2009/0162892 A1 | 6/2009 | Pompejus et al. |
| 2009/0182050 A1 | 7/2009 | Barrow et al. |
| 2009/0202672 A1 | 8/2009 | Hartnell |
| 2009/0226571 A1 | 9/2009 | Freyer |
| 2009/0263889 A1 | 10/2009 | Wumpelmann |
| 2009/0274817 A1 | 11/2009 | Yamaguchi et al. |
| 2009/0285969 A1 | 11/2009 | Schaap et al. |
| 2010/0010088 A1 | 1/2010 | Chilton et al. |
| 2010/0086638 A1 | 4/2010 | Kyle et al. |
| 2010/0151112 A1 | 6/2010 | Franklin et al. |
| 2010/0159583 A1 | 6/2010 | Onose |
| 2010/0239712 A1 | 9/2010 | Brooks et al. |
| 2010/0266681 A1 | 10/2010 | Holmeide |
| 2010/0285105 A1 | 11/2010 | Radianingtyas |
| 2010/0297292 A1 | 11/2010 | Brooks et al. |
| 2010/0297295 A1 | 11/2010 | Brooks et al. |
| 2010/0297323 A1 | 11/2010 | Brooks et al. |
| 2010/0297331 A1 | 11/2010 | Brooks et al. |
| 2010/0303961 A1 | 12/2010 | Brooks et al. |
| 2010/0303989 A1 | 12/2010 | Brooks et al. |
| 2010/0303990 A1 | 12/2010 | Brooks et al. |
| 2011/0054029 A1 | 3/2011 | Kuhrts |
| 2011/0086128 A1 | 4/2011 | Abril et al. |
| 2011/0117068 A1 | 5/2011 | Lang et al. |
| 2011/0129884 A1 | 6/2011 | Luy |
| 2011/0166228 A1 | 7/2011 | Holmeide et al. |
| 2011/0177031 A1 | 7/2011 | Apt et al. |
| 2011/0189228 A1 | 8/2011 | Bayne et al. |
| 2011/0195448 A1 | 8/2011 | Lippmeier et al. |
| 2011/0195449 A1 | 8/2011 | Lippmeier et al. |
| 2011/0203168 A1 | 8/2011 | Franklin et al. |
| 2011/0258915 A1 | 10/2011 | Subhadra |
| 2011/0287158 A1 | 11/2011 | Yamaguchi et al. |
| 2012/0213905 A1* | 8/2012 | Nichols ................. A23K 40/20 426/546 |
| 2012/0237578 A1 | 9/2012 | Lei et al. |
| 2013/0045226 A1 | 2/2013 | Avgousti et al. |
| 2013/0046020 A1 | 2/2013 | Liang et al. |
| 2013/0046105 A1 | 2/2013 | Avgousti et al. |
| 2013/0172590 A1 | 7/2013 | Pfeifer et al. |
| 2013/0302470 A1 | 11/2013 | Becker et al. |
| 2013/0344546 A1 | 12/2013 | Burja |
| 2014/0017742 A1 | 1/2014 | Streekstra et al. |
| 2015/0044356 A1 | 2/2015 | Bootsma et al. |
| 2015/0223492 A1 | 8/2015 | Pfeifer et al. |
| 2016/0066600 A1* | 3/2016 | Barrows ................. A23K 40/20 426/72 |
| 2016/0183565 A1 | 6/2016 | Rudinger et al. |
| 2016/0227816 A1 | 8/2016 | Alt et al. |
| 2016/0249642 A1 | 9/2016 | Rabe et al. |
| 2016/0255862 A1 | 9/2016 | Oelmann et al. |
| 2017/0121742 A1 | 5/2017 | Aijawi et al. |
| 2017/0245523 A1 | 8/2017 | Pfeifer et al. |
| 2017/0290356 A1 | 10/2017 | Silva et al. |
| 2017/0295824 A1 | 10/2017 | Priefert et al. |
| 2017/0298318 A1 | 10/2017 | Rabe et al. |

(56) References Cited

U.S. PATENT DOCUMENTS

| | | |
|---|---|---|
| 2017/0303561 A1 | 10/2017 | Durhuus et al. |
| 2017/0306365 A1 | 10/2017 | Rabe et al. |
| 2019/0249108 A1 | 8/2019 | Cherinko et al. |
| 2019/0300818 A1 | 10/2019 | Bärz |
| 2019/0323043 A1 | 10/2019 | Diehl |
| 2020/0015500 A1 | 1/2020 | De Vriendt |
| 2020/0231896 A1 | 7/2020 | Bahl |
| 2020/0231898 A1 | 7/2020 | Bärz |
| 2020/0339498 A1 | 10/2020 | Heining |
| 2020/0362373 A1 | 11/2020 | Leininger et al. |
| 2020/0383353 A1 | 12/2020 | Wilson et al. |
| 2020/0404938 A1 | 12/2020 | Heining et al. |
| 2021/0017467 A1 | 1/2021 | Adugna et al. |
| 2021/0024966 A1 | 1/2021 | Heining et al. |
| 2021/0163842 A1 | 6/2021 | Heining et al. |
| 2021/0171991 A1 | 6/2021 | Burja et al. |
| 2021/0207056 A1 | 7/2021 | Heining et al. |
| 2021/0386095 A1 | 12/2021 | Erickson et al. |
| 2022/0017929 A1 | 1/2022 | Priefert et al. |
| 2022/0017930 A1 | 1/2022 | Priefert et al. |

FOREIGN PATENT DOCUMENTS

| | | | |
|---|---|---|---|
| CN | 101 999 552 | 4/2011 | |
| CN | 102 687 810 | 9/2012 | |
| CN | 102919512 | 2/2013 | |
| CN | 103 070 293 | 5/2013 | |
| CN | 103 385 390 | 11/2013 | |
| DE | 10 2006 026 328 | 1/2008 | |
| GB | 1 397 410 | 6/1975 | |
| GB | 1 560 478 | 10/1976 | |
| GB | 2 324 701 | 11/1998 | |
| GB | 2 437 909 | 11/2007 | |
| WO | WO 91/07498 | 5/1991 | |
| WO | WO 94/08467 | 4/1994 | |
| WO | WO 97/36996 | 10/1997 | |
| WO | WO 97/37032 | 10/1997 | |
| WO | WO 98/49904 | 11/1998 | |
| WO | WO-9849904 A2 * | 11/1998 | ........... A23K 20/158 |
| WO | WO 01/54510 | 8/2001 | |
| WO | WO 02/00035 | 1/2002 | |
| WO | WO 2006/085672 | 8/2006 | |
| WO | WO 2006/124598 | 11/2006 | |
| WO | WO 2006/136539 | 12/2006 | |
| WO | WO 2007/074479 | 7/2007 | |
| WO | WO 2007/117511 | 10/2007 | |
| WO | WO 2008/019887 | 2/2008 | |
| WO | WO 2008/049512 | 5/2008 | |
| WO | WO-2008148873 A2 * | 12/2008 | ........... A61K 31/401 |
| WO | WO 2010/090979 | 8/2010 | |
| WO | WO 2010/120923 | 10/2010 | |
| WO | WO 2010/128312 | 11/2010 | |
| WO | WO 2011/006261 | 1/2011 | |
| WO | WO 2013/022485 | 2/2013 | |
| WO | WO 2014/045191 | 3/2014 | |
| WO | WO 2014/122087 | 8/2014 | |
| WO | WO 2014/122092 | 8/2014 | |

OTHER PUBLICATIONS

Restriction Requirement for copending U.S. Appl. No. 15/516,024, dated Mar. 4, 2019.
Non Final Office Action for copending U.S. Appl. No. 15/516,058, dated Mar. 12, 2019.
Chen, et al., "Whole cell algae powder used for increasing docosahexanoic acid content in milk of high-yielding mammal, comprises docohexanoic acid containing algae cell slurry, emulsifier, antioxidant, filler, packaging material, dispersant and water," WPI/Thompson, Bd. 2011, Nr. 44, (Apr. 6, 2011); XP-002721747, Abstract only.
Uemura, "Synthesis and production of unsaturated and polyunsaturated fatty acids in yeast: current state and perspectives," *Appl. Microbiol. Biotechnol.* 95:1-12 (May 2012).
Visentainer, et al., "Influence of diets enriched with flaxseed oil on the α-linolenic, eicosapentaenoic and docosahexaenoic fatty acid in Nile tilapia (*Oreochromis niloticus*)," *Food Chemistry* 90:557-560 (May 2005).
English language translation International Search Report for PCT/EP2015/071666 filed Sep. 22, 2015.
English language translation of the Written Opinion of the International Searching Authority for PCT/EP2015/071666 filed Sep. 22, 2015.
English language translation of the International Preliminary Report on Patentability for PCT/EP2015/071666 filed Sep. 22, 2015.
European Search Report for EP 14 18 7485 filed Oct. 2, 2014.
English translation of the International Search Report for PCT/EP2015/071707 filed Sep. 22, 2015 for copending U.S. Appl. No. 15/516,044.
English language translation of the Written Opinion of the International Searching Authority for PCT/EP2015/071707 filed Sep. 22, 2015 for copending U.S. Appl. No. 15/516,044.
English language translation of the International Preliminary Report on Patentability for PCT/EP2015/071707 filed Sep. 22, 2015 for copending U.S. Appl. No. 15/516,044.
European Search Report with partial machine translation for EP 14 18 7479 filed Oct. 2, 2014 for copending U.S. Appl. No. 15/516,044.
English translation of the International Search Report for PCT/EP2015/071635 filed Sep. 22, 2015 for copending U.S. Appl. No. 15/516,024.
English language translation of the Written Opinion of the International Searching Authority for PCT/EP2015/071635 filed Sep. 22, 2015 for copending U.S. Appl. No. 15/516,024.
English language translation of the International Preliminary Report on Patentability for PCT/EP2015/071635 filed Sep. 22, 2015 for copending U.S. Appl. No. 15/516,024.
European Search Report with partial machine translation for EP 14 18 7471 filed Oct. 2, 2014 for copending U.S. Appl. No. 15/516,024.
English translation of the International Search Report for PCT/EP2015/071689 filed Sep. 22, 2015 for copending U.S. Appl. No. 15/516,023.
English language translation of the Written Opinion of the International Searching Authority for PCT/EP2015/071689 filed Sep. 22, 2015 for copending U.S. Appl. No. 15/516,023.
English language translation of the International Preliminary Report on Patentability for PCT/EP2015/071689 filed Sep. 22, 2015 for copending U.S. Appl. No. 15/516,023.
European Search Report with partial machine translation for EP 14 18 7467 filed Oct. 2, 2014 for copending U.S. Appl. No. 15/516,023.
English translation of the International Search Report for PCT/EP2015/072824 filed Oct. 2, 2015 for copending U.S. Appl. No. 15/516,058.
English language translation of the Written Opinion of the International Searching Authority for PCT/EP2015/072824 filed Oct. 2, 2015 for copending U.S. Appl. No. 15/516,058.
English language translation of the International Preliminary Report on Patentability for PCT/EP2015/072824 filed Oct. 2, 2015 for copending U.S. Appl. No. 15/516,058.
European Search Report with partial machine translation for EP 14 18 7471 filed Oct. 2, 2014 for copending U.S. Appl. No. 15/516,058.
Asha, et al., "Effect of sea weed, sea grass and powdered algae in rearing the hatchery produced juveniles of *Holothuria* (metriatyla) *scabra*, jeager," *Proceedings of the National Symposium on Recent Trends in Fisheries*, (2004).
Baeverfjord, et al., "Low feed pellet water stability and fluctuating water salinity cause separation and accumulation of dietary oil in the stomach of rainbow trout (*Oncorhrynchus* mykiss)," *Aquaculture* 261(4):1335-1345 (Dec. 2006).
Carter, et al., "Potential of Thraustochytrids to Partially Replace Fish Oil in Atlantic Salmon Feeds," *Marine Biotechnology* 5:480-492 (Oct. 2002).
Hondo, et al., "*Schizochytrium limacinum* sp. nov., a new thraustochytrid from a mangrove area in the west Pacific Ocean," *Mycological Research* 102(4):439-448 (Apr. 1998).
Jain, et al., "Extracellular Polysaccharide Production by Thraustochytrid Protists," *Marine Biotechnology* 7:184-192 (published online May 2005).

(56) References Cited

OTHER PUBLICATIONS

Miller, et al., Replacement of fish oil with thraustochytrid *Schizochytrium* sp. L oil in Atlantic salmon parr (*Salmo* salar L) diets, *Comparative Biochemistry and Physiology, Part A* 148:382-392 (available online May 2007).
Nakahara, et al., "Production of Docosahexaenoic and Docosapentaenioc Acids by *Schizochytrium* sp. Isolated from Yap Islands," *Journal of American Oil Chemists' Society* 73(11):1421-1425 (Nov. 1996).
Prabu, et al., "Effect of sodium sulphate salinity for production of docosahexaenoic acid (DHA) by *Thraustochytrids aureum* RAK-21," *Asian Biomedicine* 6(5):693-701 (Oct. 2012).
Taxonomy Browser: *Aurantiochytrium limacinum*; taxonomy ID: 87102 (Jan. 2015).
XP-002721747; Database WPI Thomson Scientific, London GB; (Sep. 2013).
XP-002534705; Degussa: "Product Information SIPERNAT D17," Internet citation (Sep. 2004).
U.S. Appl. No. 14/904,665, filed Jan. 12, 2016, US-2016/0183565, Jun. 30, 2016, Rudinger.
U.S. Appl. No. 15/027,429, filed Apr. 5, 2016, US-2016/0249642, Sep. 1, 2016, Rabe.
U.S. Appl. No. 15/516,038, filed Mar. 31, 2017, Rabe.
U.S. Appl. No. 15/516,023, filed Mar. 31, 2017, Silva.
U.S. Appl. No. 15/516,024, filed Mar. 31, 2017, Priefert.
U.S. Appl. No. 15/516,044, filed Mar. 31, 2017, Rabe.
U.S. Appl. No. 15/516,058, filed Mar. 31, 2017, Durhuus.
Suomalainen, et al., "The Fatty Acid Composition of Baker's and Brewer's Yeast," *Chem. Phys. Lipids* 2:296-315 (1968).
Technicial Information 1251 (2017) http://www.sipernat.com/sites/lists/RE/DocumentsSI/TI-1251-AEROSIL-and-SIPERNAT-Silica-Versatile-Raw-Materials-for-Personal-Care-Formulations-EN.pdf download Apr. 11, 2018 (Year: 2017).
Response to Restriction Requirement for copending U.S. Appl. No. 15/516,024, filed May 4, 2019.
Restriction Requirement for copending U.S. Appl. No. 15/516,023, dated May 7, 2019.
Amendment and Response to Non Final Office Action for copending U.S. Appl. No. 15/516,058, filed Jun. 22, 2019.
Keleb, et al., "Continous twin screw extrusion for the wet granulation of lactose," *International Journal of Pharmaceutics* 239:69-80 (2002).
Restriction Requirement for copending U.S. Appl. No. 15/516,058, dated Oct. 12, 2018.
Response to Restriction Requirement for copending U.S. Appl. No. 15/516,058, filed Dec. 12, 2018.
Amendment to accompany Response to Restriction Requirement for copending U.S. Appl. No. 15/516,058, filed Dec. 12, 2018.
Restriction Requirement for copending U.S. Appl. No. 15/516,044, dated Oct. 25, 2018.
Response to Restriction Requirement for copending U.S. Appl. No. 15/516,044, filed Dec. 25, 2018.
Amendment to accompany Response to Restriction Requirement for copending U.S. Appl. No. 15/516,044, filed Dec. 25, 2018.
Hammond, et al., "Safety Assessment of DHA-Rich Microalgae from *Schizochytrium* sp.," *Regulatory Toxicology and Pharmacology* 33(2):192-204 (Apr. 2001).
Final Rejection dated Aug. 29, 2019, for copending U.S. Appl. No. 15/516,058.
Amendment and Response to Final Rejection filed Dec. 29, 2019, for copending U.S. Appl. No. 15/516,058.
Notice of Appeal filed Dec. 29, 2019, for copending U.S. Appl. No. 15/516,058.
Amendment and Response to Office Action filed Nov. 24, 2019, for copending U.S. Appl. No. 15/516,023.
Notice of Allowance dated Nov. 26, 2019, for copending U.S. Appl. No. 15/516,044.
Amendment Under Rule 312 filed Dec. 16, 2019, for copending U.S. Appl. No. 15/516,044.
Amendment and Response to Office Action filed Dec. 16, 2019, for copending U.S. Appl. No. 15/516,024.
Amendment & Response to Final Office Action filed Aug. 4, 2020, for copending U.S. Appl. No. 15/516,023.
Request for Continued Examination for copending US application filed Aug. 4, 2020, for copending U.S. Appl. No. 15/516,023.
Non Final Rejection dated Sep. 29, 2020, for copending U.S. Appl. No. 15/516,023.
Notice of Appeal filed Jul. 18, 2020, for copending U.S. Appl. No. 15/516,024.
Appeal Brief filed Oct. 19, 2020, for copending U.S. Appl. No. 15/516,024.
Leyland, et al., "Are Thraustochytrids algae?," *Fungal Biology XXX*:1-6 (2017); http://dx.doi./org/10.1016/j.funbio.2017.07.006.
Raghukumar S., "Ecology of the marine protists, the Labyrinthulomycetes (Thraustochytrids and Labyrinthulids)," *Europ. J. Protistol.* 38:127-145 (2002).
Ratledge, C.," Exhibit A, Microbial production of polyunsaturated fatty acides as nutraceuticals," Microbial Production of Food Ingredients, Enzymes and Nutraceuticals, 2 pages (2013).
U.S. Appl. No. 16/956,453, filed Jun. 19, 2020, US-2020/0339498 A1, Oct. 29, 2020, Heining.
U.S. Appl. No. 17/055,047, filed Nov. 12, 2020, Heining.
U.S. Appl. No. 17/055,083, filed Nov. 12, 2020, Heining.
Final Office Action dated Mar. 4, 2020 for copending U.S. Appl. No. 15/516,023.
Final Office Action dated Mar. 19, 2020 for copending U.S. Appl. No. 15/516,024.
Appeal Brief filed Mar. 3, 2020 for copending U.S. Appl. No. 15/516,058.
Advisory Action dated Apr. 6, 2020 for copending U.S. Appl. No. 15/516,058.
Notice of Allowance dated Jun. 4, 2020 for copending U.S. Appl. No. 15/516,058.
Request for Continued Examination for copending U.S. Appl. No. 15/516,058, filed Jun. 18, 2020.
U.S. Appl. No. 16/317,249, filed Jan. 11, 2019, US-2019/0300818 A1, Oct. 3, 2019, Bärz.
U.S. Appl. No. 16/317,305, filed Jan. 11, 2019, Bärz.
U.S. Appl. No. 16/473,805, filed Jun. 26, 2019, US-2019/0323043 A1, Oct. 24, 2019, Diehl.
U.S. Appl. No. 16/639,529, filed Feb. 14, 2020, Burja.
U.S. Appl. No. 16/644,443, filed Mar. 4, 2020, Bahl.
Amendment & Response to Non Final Office Action filed Jan. 29, 2021, for copending U.S. Appl. No. 15/516,023.
Final office Action dated Mar. 11, 2021, for copending U.S. Appl. No. 15/516,023.
Amendment & Response to Accompany RCE filed Jul. 12, 2021, for copending U.S. Appl. No. 15/516,023.
Request for Continued Examination filed Jul. 12, 2021, for copending U.S. Appl. No. 15/516,023.
Non Final Office Action dated Aug. 3, 2021, for copending U.S. Appl. No. 15/516,023.
Amendment & Response to Non Final Office Action filed Dec. 2, 2021, for copending U.S. Appl. No. 15/516,023.
Notice of Allowance dated Jan. 28, 2022, for copending U.S. Appl. No. 15/516,023.
Examiner's Answer dated Jan. 28, 2021, for copending U.S. Appl. No. 15/516,024.
Reply Brief filed Mar. 26, 2021, for copending U.S. Appl. No. 15/516,024.
U.S. Appl. No. 16/309,632, filed Dec. 13, 2018, US-2019/0249108 A1, Aug. 15, 2019, Cherinko.
U.S. Appl. No. 16/636,940, filed Feb. 6, 2020, US-2020/0362373 A1, Nov. 19, 2020, Leininger.
U.S. Appl. No. 16/886,691, filed May 28, 2020, US-2020/0383353 A1, Dec. 10, 2020, Wilson.
U.S. Appl. No. 16/956,820, filed Jun. 22, 2020, US-2020/0404938 A1, Dec. 31, 2020, Heining.
U.S. Appl. No. 17/042,788, filed Sep. 28, 2020, US-2021/0024966 A1, Jan. 28, 2021, Heining.
U.S. Appl. No. 17/042,791, filed Sep. 28, 2020, US-2021/0017467 A1, Jan. 21, 2021, Adugna.
U.S. Appl. No. 17/284,463, filed Apr. 10, 2021, US-2021/0386095 A1, Dec. 16, 2021, Erickson.

(56) References Cited

OTHER PUBLICATIONS

U.S. Appl. No. 17/291,608, filed May 6, 2021, US-2022/0017929 A1, Jan. 20, 2022, Priefert.
U.S. Appl. No. 17/291,610, filed May 6, 2021, US-2022/0017930 A1, Jan. 20, 2022, Priefert.

* cited by examiner

FEEDSTUFF OF HIGH ABRASION RESISTANCE AND GOOD STABILITY IN WATER, CONTAINING PUFAS

CROSS REFERENCE TO RELATED APPLICATIONS

The present application is US national stage of international application PCT/EP2015/071666, which had an international filing date of Sep. 22, 2015, and which was published in German under PCT Article 21(2) on Apr. 7, 2016. Priority is claimed to European application EP 14187485.9, filed on Oct. 2, 2014.

The present invention relates to a PUFA (polyunsaturated fatty acid)-containing feedstuff having high abrasion resistance and high water stability.

Processes for producing PUFA-containing biomass have already been described in the prior art. PUFA-containing biomass together with other feedstuff ingredients can be further processed by, for example, extrusion.

It is desirable for the feedstuff obtained to have particular product properties. For instance, it is advantageous for each feedstuff to have a high abrasion resistance. This is because high abrasion resistance means in particular that damage to the feedstuff during transport can be largely prevented.

Especially for a feedstuff in aquaculture, it is additionally desirable for it to have a high water stability, i.e. for it to remain intact for as long as possible after addition to water and thus be available as feedstuff to the fish for a prolonged period.

It is therefore an object of the present invention to provide a PUFA-containing feedstuff having improved product properties, in particular having a high abrasion resistance and/or a high water stability.

According to the invention, it was found that, surprisingly, a feedstuff having a very high abrasion resistance and very high water stability can be obtained when, during the production of the feedstuff, use is made of a Labyrinthulea biomass obtained by culturing in a concentration of sulphate such that the resulting biomass, with regard to the dry mass, has a sulphate content of 25 to 60 g/kg, in particular 25 to 50, 25 to 40 or 25 to 35 g/kg.

If another biomass or fish oil is used as PUFA source instead of the Labyrinthulea biomass to be used according to the invention, a feedstuff having a distinctly lower abrasion resistance and a distinctly lower water stability is obtained.

The present invention therefore firstly provides a feedstuff containing PUFAs, characterized in that it has an abrasion resistance of at least 91%. The abrasion resistance is preferably at least 92 or 93%, especially preferably at least 94%.

The present invention therefore also further provides a feedstuff containing PUFAs, characterized in that it has a water stability of at least 96%. The water stability is preferably at least 97%, especially preferably at least 98%.

The feedstuff is produced by extrusion. Extrusion is preferably followed by coating of the extrudate with oil. The abrasion resistance of the feedstuff was determined using the uncoated extrudate; by contrast, the water stability of the feedstuff was carried out using the extrudate subsequently coated with oil.

The present invention therefore also further provides a process for producing a feedstuff, in particular extrudate, according to the invention, characterized in that a PUFA-containing biomass having a sulphate content of 25 to 60 g per kilogram of biomass and preferably obtained as indicated above is extruded together with other feedstuff components and, optionally, the extrudate thus obtained is loaded with oil, preferably after being dried beforehand.

Abrasion resistance is determined by exposing the sample to a mechanical agitation and then determining the amount of fine particles detached from the sample. According to the invention, abrasion resistance was determined as follows: The dried extrudate (having a diameter of 4 mm and a length of 4 mm) was exposed to a mechanical load using the Holmen pellet tester NH P100 (Borregaard Lignotech, Hull, UK). Before carrying out the test, the samples were screened in order to remove any adherent fine particles. The processed samples (100 g) were subsequently introduced into the pellet tester using a 2.5 mm filter screen. The pellets were subsequently conveyed through a pipe having right-angled pipe bends at high air velocity (about 70 mbar) for 30 seconds. The experimental parameters are predetermined by the equipment. Subsequently, abrasion was determined by weighing. Abrasion resistance was specified as PDI (Pellet Durability Index), defined as the amount in percent of sample remaining in the filter screen after the test has been carried out. The test was carried out with three samples and then the mean was determined.

Water stability was determined using the oil-loaded samples. The method was essentially carried out as described by Baeverfjord et al. (2006; Aquaculture 261, 1335-1345), with slight modifications. 10 g samples of the extrudate (having a length and a diameter of 4 mm in each case) were introduced into metallic infusion baskets (Inox, Germany) having a diameter of 6.5 mm and a mesh size of 0.3 mm. The infusion baskets were subsequently introduced into a plastic trough containing water, and so the samples were completely covered with water. The trough was subsequently exposed for 30 minutes to a shake-agitation of 30 shake units per minute using the Multiorbital shaker PSU-201 (Biosan, Latvia). Thereafter, the samples were carefully dried with blotting paper and then weighed before and after they had been subjected to oven-drying at a temperature of 105° C. for 24 hours. Water stability was calculated as the difference in the dry weight of the sample before and after the incubation in water and specified in percent of the dry weight of the sample used before the incubation with water.

The feedstuff according to the invention preferably has a bulk density of 400 to 600 g/l.

A feedstuff according to the invention is preferably obtained by extrusion of a feedstuff composition containing a Labyrinthulea biomass to be used according to the invention.

For setting the desired abrasion resistance and water stability, it proved to be especially advantageous according to the invention when the extrusion is done at an energy input of 12-28 Wh/kg, in particular 14-26 Wh/kg, especially preferably 16-24 Wh/kg, above all 18-22 Wh/kg.

In this connection, a screw or twin-screw extruder is preferably employed in the extrusion process. The extrusion process is preferably carried out at a temperature of 80-220° C., in particular 80-130° C., above all 95-110° C., a pressure of 10-40 bar, and a shaft rotational speed of 100-1000 rpm, in particular 300-700 rpm. The residence time of the mixture introduced is preferably 5-30 seconds, in particular 10-20 seconds.

The extrusion process may optionally comprise a compacting step and/or a compression step.

It is preferred to intimately mix the components with each other before carrying out the extrusion process. This is preferably carried out in a drum equipped with vanes. In a preferred embodiment, this mixing step includes an injection of steam, in particular so as to bring about swelling of the starch which is preferably present. In this case, the injection of steam is carried out preferably at a pressure of 1 to 5 bar, especially preferably at a pressure of 2 to 4 bar.

Before being mixed with the algae biomass, the further foodstuff or feedstuff ingredients are preferably comminuted—if required—so as to ensure that a homogeneous mixture is obtained in the mixing step. The comminuting of the further foodstuff or feedstuff ingredients may be carried out, for example, using a hammer mill.

The extrudate created preferably has a diameter of 1 to 14 mm, preferably 2 to 12 mm, in particular 2 to 6 mm, and preferably also has a length of 1 to 14 mm, preferably 2 to 12 mm, in particular 2 to 6 mm. The length of the extrudate is set during extrusion by using a cutting tool. The length of the extrudate is preferably selected such that it approximately corresponds to the diameter of the extrudate. The diameter of the extrudate is defined by selecting the screen diameter.

In one embodiment preferred according to the invention, the extrusion process is followed by the extrudate obtained being loaded with oil. To this end, the extrudate is preferably initially dried to a moisture content of at most 5% by weight. According to the invention, the extrusion product may be loaded with oil by, for example, placing the extrudate in oil or spraying the extrudate with oil; however, according to the invention, preference is given to vacuum coating.

Production of Labyrinthulea biomasses usable according to the invention has been described in detail in the prior art. The specific part of the invention is that a Labyrinthulea biomass having a very high sulphate content is used in order to produce feedstuff according to the invention. In this way, a biomass having a very high content of exopolysaccharides is obtained. It is presumed that this ultimately leads to the extruded feedstuff having such a high abrasion resistance and water stability.

The cells of the taxon Labyrinthulea that are usable according to the invention are also called Labyrinthulomycetes or slime nets. Labyrinthulea which are preferably used belong to the family of the Thraustochytriaceae. The family of the Thraustochytriaceae includes the genera *Althomia, Aplanochytrium, Elnia, Japonochytrium, Schizochytrium, Thraustochytrium, Aurantiochytrium, Oblongichytrium* and *Ulkenia*. The biomass particularly preferably comprises cells from the genera *Thraustochytrium, Schizochytrium, Aurantiochytrium* or *Oblongichytrium*, above all those from the genus *Aurantiochytrium*.

Within the genus *Aurantiochytrium*, preference is given, according to the invention, to the species *Aurantiochytrium limacinum* (previously also known as *Schizochytrium limacinum*). According to the invention, very particular preference is given to using the strain *Aurantiochytrium limacinum* SR21.

According to the invention, polyunsaturated fatty acids (PUFAs) are understood to mean fatty acids having at least two, particularly at least three, C—C double bonds. According to the invention, highly unsaturated fatty acids (HUFAs) are preferred among the PUFAs. According to the invention, HUFAs are understood to mean fatty acids having at least four C—C double bonds.

The PUFAs may be present in the cell in free form or in bound form. Examples of the presence in bound form are phospholipids and esters of the PUFAs, in particular monoacyl-, diacyl- and triacylglycerides. In a preferred embodiment, the majority of the PUFAs is present in the form of triglycerides, with preferably at least 50% by weight, in particular at least 75% by weight and, in an especially preferred embodiment, at least 90% by weight of the PUFAs present in the cell being present in the form of triglycerides.

Preferred PUFAs are omega-3 fatty acids and omega-6 fatty acids, with omega-3 fatty acids being especially preferred. Preferred omega-3 fatty acids in this context are eicosapentaenoic acid (EPA, 20:5ω-3), in particular (5Z,8Z,11Z,14Z,17Z)-eicosa-5,8,11,14,17-pentaenoic acid, and docosahexaenoic acid (DHA, 22:6ω-3), in particular (4Z,7Z,10Z,13Z,16Z,19Z)-docosa-4,7,10,13,16,19-hexaenoic acid, with docosahexaenoic acid being especially preferred.

The cells present in the biomass are preferably distinguished by the fact that they have a PUFA content, preferably DHA content, of at least 20% by weight, preferably at least 25% by weight, in particular at least 30% by weight, based in each case on the cell dry mass, with preferably at least 50% by weight, in particular at least 75% by weight and, in an especially preferred embodiment, at least 90% by weight of the lipids present in the cell being present in the form of triglycerides.

The other feedstuff ingredients are preferably selected from protein-containing, carbohydrate-containing, nucleic-acid-containing and lipid-soluble components and, if appropriate, further fat-containing components and furthermore from among other additives such as minerals, vitamins, pigments and amino acids. Besides, structurants may also be present, besides nutrients, for example so as to improve the texture or the appearance of the feedstuff. Furthermore, it is also possible to employ, for example, binders so as to influence the consistency of the feedstuff. A component which is preferably employed and which constitutes both a nutrient and a structurant is starch.

In a preferred embodiment, the extrudate obtained is subsequently coated with oil. In this respect, a distinction has to be made according to the invention between uncoated extrudate and extrudate subsequently coated with oil. The extrudate is, with regard to the final product, preferably coated with 3 to 18% by weight, in particular 5 to 15% by weight, above all 7 to 13% by weight, of oil. The extrudate is preferably coated with oil by vacuum evaporation.

According to the invention, a feedstuff according to the invention having an abrasion resistance of at least 91% is preferably distinguished by the fact that it contains a Labyrinthulea biomass in an amount of 2 to 24% by weight, preferably 4 to 22% by weight, in particular 9 to 20% by weight, above all 11 to 18% by weight.

Said feedstuff preferably additionally has at least one, preferably all, of the following properties:
  a) a total protein content of 33 to 67% by weight, preferably 39 to 61% by weight, in particular 44 to 55% by weight;
  b) a total fat content of 5 to 25% by weight, preferably 8 to 22% by weight, in particular 10 to 20% by weight, above all 12 to 18% by weight;
  c) a total starch content of at most 25% by weight, in particular at most 20% by weight, preferably 6 to 17% by weight, especially preferably 8 to 14% by weight;
  d) a polyunsaturated fatty acid (PUFA) content of 2 to 13% by weight, preferably 3 to 11% by weight, in particular 4 to 10% by weight, above all 5.5 to 9% by weight;
  e) an omega-3 fatty acid content of 1 to 7% by weight, preferably 1.5 to 5.5% by weight, in particular 2 to 5% by weight, above all 2.5 to 4.5% by weight;
  f) a DHA content of 0.5 to 3% by weight, preferably 0.8 to 2.8% by weight, in particular 1 to 2.8% by weight, above all 1.3 to 2.4% by weight, in particular 1.3 to 2.2% by weight.

The invention therefore preferably provides a feedstuff, in particular extrudate, having an abrasion resistance of at least 91, 92, 93 or 94% and additionally having at least one, preferably all, of the following properties:
a) a total protein content of 33 to 67% by weight, preferably 39 to 61% by weight, in particular 44 to 55% by weight;
b) a total fat content of 5 to 25% by weight, preferably 8 to 22% by weight, in particular 10 to 20% by weight, above all 12 to 18% by weight;
c) a total starch content of at most 25% by weight, in particular at most 20% by weight, preferably 6 to 17% by weight, especially preferably 8 to 14% by weight;
d) a polyunsaturated fatty acid (PUFA) content of 2 to 13% by weight, preferably 3 to 11% by weight, in particular 4 to 10% by weight, above all 5.5 to 9% by weight;
e) an omega-3 fatty acid content of 1 to 7% by weight, preferably 1.5 to 5.5% by weight, in particular 2 to 5% by weight, above all 2.5 to 4.5% by weight;
f) a DHA content of 0.5 to 3% by weight, preferably 0.8 to 2.8% by weight, in particular 1 to 2.8% by weight, above all 1.3 to 2.4% by weight, in particular 1.3 to 2.2% by weight.

The invention therefore also preferably provides a feedstuff, in particular extrudate, having an abrasion resistance of at least 91, 92, 93 or 94% and additionally having at least one, preferably all, of the following properties:
a) a total protein content of 33 to 67% by weight, preferably 39 to 61% by weight, in particular 44 to 55% by weight;
b) a total fat content of 5 to 25% by weight, preferably 8 to 22% by weight, in particular 10 to 20% by weight, above all 12 to 18% by weight;
c) a total starch content of at most 25% by weight, in particular at most 20% by weight, preferably 6 to 17% by weight, especially preferably 8 to 14% by weight;
d) a content of Labyrinthulea biomass, in particular Thraustochytriaceae biomass, of 2 to 24% by weight, preferably 4 to 22% by weight, in particular 9 to 20% by weight, above all 11 to 18% by weight;
e) a polyunsaturated fatty acid (PUFA) content of 2 to 13% by weight, preferably 3 to 11% by weight, in particular 4 to 10% by weight, above all 5.5 to 9% by weight;
f) an omega-3 fatty acid content of 1 to 7% by weight, preferably 1.5 to 5.5% by weight, in particular 2 to 5% by weight, above all 2.5 to 4.5% by weight;
g) a DHA content of 0.5 to 3% by weight, preferably 0.8 to 2.8% by weight, in particular 1 to 2.8% by weight, above all 1.3 to 2.4% by weight, in particular 1.3 to 2.2% by weight.

The invention therefore also preferably provides a feedstuff, in particular extrudate, having an abrasion resistance of at least 91, 92, 93 or 94% and additionally having at least one, preferably all, of the following properties:
a) a total protein content of 33 to 67% by weight, preferably 39 to 61% by weight, in particular 40 to 50% by weight;
b) a total fat content of 5 to 25% by weight, preferably 8 to 22% by weight, in particular 10 to 20% by weight, above all 12 to 18% by weight;
c) a total starch content of at most 25% by weight, in particular at most 20% by weight, preferably 6 to 17% by weight, especially preferably 8 to 14% by weight;
d) a content of *Aurantiochytrium* biomass, in particular *Aurantiochytrium limacinum* biomass, above all *Aurantiochytrium limacinum* SR21 biomass, of 2 to 24% by weight, preferably 4 to 22% by weight, in particular 9 to 20% by weight, above all 11 to 18% by weight;
e) a polyunsaturated fatty acid (PUFA) content of 2 to 13% by weight, preferably 3 to 11% by weight, in particular 4 to 10% by weight, above all 5.5 to 9% by weight;
f) an omega-3 fatty acid content of 1 to 7% by weight, preferably 1.5 to 5.5% by weight, in particular 2 to 5% by weight, above all 2.5 to 4.5% by weight;
g) a DHA content of 0.5 to 3% by weight, preferably 0.8 to 2.8% by weight, in particular 1 to 2.8% by weight, above all 1.3 to 2.4% by weight, in particular 1.3 to 2.2% by weight.

Accordingly, compositions having the features mentioned in the lists shown above are preferably used for producing feedstuff according to the invention having high abrasion resistance.

According to the invention, a feedstuff according to the invention having an abrasion resistance of at least 91% is accordingly preferably obtained by extrusion of a feedstuff mixture containing the above-mentioned components, with the extrusion preferably being carried out as described above, in particular at an energy input of 12-28 Wh/kg, in particular 14-26 Wh/kg, especially preferably 16-24 Wh/kg, above all 18-22 Wh/kg.

According to the invention, a feedstuff according to the invention having a water stability of at least 96% is preferably likewise obtained by extrusion of a feedstuff mixture containing the above-mentioned components, with the extrusion likewise preferably being carried out as described above, in particular at an energy input of 12-28 Wh/kg, in particular 14-26 Wh/kg, especially preferably 16-24 Wh/kg, above all 18-22 Wh/kg, with the extrusion process being followed by coating of the extrudate with oil in an amount of 3 to 18% by weight, in particular 5 to 15% by weight, above all 7 to 13% by weight, with regard to the final product.

According to the invention, a feedstuff according to the invention having a water stability of at least 96% is preferably distinguished by the fact that it contains a Labyrinthulea biomass in an amount of 2 to 22% by weight, preferably 4 to 20% by weight, in particular 8 to 18% by weight, above all 10 to 16% by weight.

Said feedstuff preferably additionally has at least one, preferably all, of the following properties:
a) a total protein content of 30 to 60% by weight, preferably 35 to 55% by weight, in particular 40 to 50% by weight;
b) a total fat content of 15 to 35% by weight, preferably 18 to 32% by weight, in particular 20 to 30% by weight, above all 22 to 28% by weight;
c) a total starch content of at most 25% by weight, in particular at most 20% by weight, preferably 5 to 15% by weight, especially preferably 7 to 13% by weight;
d) a polyunsaturated fatty acid (PUFA) content of 2 to 12% by weight, preferably 3 to 10% by weight, in particular 4 to 9% by weight, above all 5 to 8% by weight;
e) an omega-3 fatty acid content of 1 to 6% by weight, preferably 1.5 to 5% by weight, in particular 2 to 4.5% by weight, above all 2.5 to 4% by weight;
f) a DHA content of 0.5 to 3% by weight, preferably 0.8 to 2.5% by weight, in particular 1 to 2.5% by weight, above all 1.2 to 2.2% by weight, in particular 1.2 to 2.0% by weight.

The invention therefore also preferably provides a feedstuff, in particular extrudate, having a water stability of at least 96, 97 or 98% and additionally having at least one, preferably all, of the following properties:
- a) a total protein content of 30 to 60% by weight, preferably 35 to 55% by weight, in particular 40 to 50% by weight;
- b) a total fat content of 15 to 35% by weight, preferably 18 to 32% by weight, in particular 20 to 30% by weight, above all 22 to 28% by weight;
- c) a total starch content of at most 25% by weight, in particular at most 20% by weight, preferably 5 to 15% by weight, especially preferably 7 to 13% by weight;
- d) a polyunsaturated fatty acid (PUFA) content of 2 to 12% by weight, preferably 3 to 10% by weight, in particular 4 to 9% by weight, above all 5 to 8% by weight;
- e) an omega-3 fatty acid content of 1 to 6% by weight, preferably 1.5 to 5% by weight, in particular 2 to 4.5% by weight, above all 2.5 to 4% by weight;
- f) a DHA content of 0.5 to 3% by weight, preferably 0.8 to 2.5% by weight, in particular 1 to 2.5% by weight, above all 1.2 to 2.2% by weight, in particular 1.2 to 2.0% by weight.

The invention therefore also preferably provides a feedstuff, in particular extrudate, having a water stability of at least 96, 97 or 98% and additionally having at least one, preferably all, of the following properties:
- a) a total protein content of 30 to 60% by weight, preferably 35 to 55% by weight, in particular 40 to 50% by weight;
- b) a total fat content of 15 to 35% by weight, preferably 18 to 32% by weight, in particular 20 to 30% by weight, above all 22 to 28% by weight;
- c) a total starch content of at most 25% by weight, in particular at most 20% by weight, preferably 5 to 15% by weight, especially preferably 7 to 13% by weight;
- d) a content of Labyrinthulea biomass, in particular Thraustochytriaceae biomass, of 2 to 22% by weight, preferably 4 to 20% by weight, in particular 8 to 18% by weight, above all 10 to 16% by weight;
- e) a polyunsaturated fatty acid (PUFA) content of 2 to 12% by weight, preferably 3 to 10% by weight, in particular 4 to 9% by weight, above all 5 to 8% by weight;
- f) an omega-3 fatty acid content of 1 to 6% by weight, preferably 1.5 to 5% by weight, in particular 2 to 4.5% by weight, above all 2.5 to 4% by weight;
- g) a DHA content of 0.5 to 3% by weight, preferably 0.8 to 2.5% by weight, in particular 1 to 2.5% by weight, above all 1.2 to 2.2% by weight, in particular 1.2 to 2.0% by weight.

The invention therefore also preferably provides a feedstuff, in particular extrudate, having a water stability of at least 96, 97 or 98% and additionally having at least one, preferably all, of the following properties:
- a) a total protein content of 30 to 60% by weight, preferably 35 to 55% by weight, in particular 40 to 50% by weight;
- b) a total fat content of 15 to 35% by weight, preferably 18 to 32% by weight, in particular 20 to 30% by weight, above all 22 to 28% by weight;
- c) a total starch content of at most 25% by weight, in particular at most 20% by weight, preferably 5 to 15% by weight, especially preferably 7 to 13% by weight;
- d) a content of *Aurantiochytrium* biomass, in particular *Aurantiochytrium limacinum* biomass, above all *Aurantiochytrium limacinum* SR21 biomass, of 2 to 22% by weight, preferably 4 to 20% by weight, in particular 8 to 18% by weight, above all 10 to 16% by weight;
- e) a polyunsaturated fatty acid (PUFA) content of 2 to 12% by weight, preferably 3 to 10% by weight, in particular 4 to 9% by weight, above all 5 to 8% by weight;
- f) an omega-3 fatty acid content of 1 to 6% by weight, preferably 1.5 to 5% by weight, in particular 2 to 4.5% by weight, above all 2.5 to 4% by weight;
- g) a DHA content of 0.5 to 3% by weight, preferably 0.8 to 2.5% by weight, in particular 1 to 2.5% by weight, above all 1.2 to 2.2% by weight, in particular 1.2 to 2.0% by weight.

According to the invention, the fat-containing component used may be, besides the biomass to be used according to the invention, fats, in particular oils, of both animal and plant origin. According to the invention, suitable fat-containing components are in particular vegetable oils, for example soya bean oil, rapeseed oil, sunflower seed oil, flaxseed oil or palm oil and mixtures thereof. In addition, fish oil may also optionally be used as fat-containing component in low amounts.

Preferably, a feedstuff according to the invention having a water stability of at least 96, 97 or 98% contains vegetable oils in an amount of 3 to 18% by weight, in particular 5 to 15% by weight, above all 7 to 13% by weight. As described above, the vegetable oil is in this connection preferably applied to the extrudate in a subsequent manner, in particular by vacuum coating.

According to the invention, the protein-containing component used may be, for example, soya protein, pea protein, wheat gluten or corn gluten and mixtures thereof.

The following examples may be employed as a protein-containing component which additionally contains fats: fish meal, krill meal, bivalve meal, squid meal or shrimp shells. These are hereinafter subsumed under the term "marine meal". In a preferred embodiment, a feedstuff according to the invention comprises marine meal, preferably fish meal, in an amount of 3 to 18% by weight, in particular 5 to 15% by weight, above all 7 to 13% by weight.

The carbohydrate-containing component used may be, for example, wheat meal, sunflower meal or soya meal and mixtures thereof.

The foodstuff or feedstuff is preferably a product for use in aquaculture or a foodstuff or feedstuff for use in poultry production, pig production or cattle production. The feedstuff may also take the form of a feedstuff which is employed for growing small organisms which may be employed as feedstuff in aquaculture. The small organisms may take the form of, for example, nematodes, crustaceans or rotifers. The feedstuff is preferably present in the form of flakes, spheres or tablets. A feedstuff obtainable by extrusion has a moisture content of preferably less than 5% by weight, especially preferably 0.2 to 4% by weight.

The feedstuff for use in aquaculture is preferably used for breeding finish and crustaceans which are preferably intended for human nutrition. These include, in particular, carp, tilapia, catfish, tuna, salmon, trout, barramundi, bream, perch, cod, shrimps, lobster, crabs, prawns and crayfish. It is especially preferably a feedstuff for salmon farming. Preferred types of salmon in this context are the Atlantic salmon, red salmon, masu salmon, king salmon, keta salmon, coho salmon, Danube salmon, Pacific salmon and pink salmon.

Alternatively, it may also be a feedstuff intended for farming fish which are subsequently processed to give fish meal or fish oil. In this connection, the fish are preferably herring, pollack, menhaden, anchovies, capelin or cod. The fish meal or fish oil thus obtained, in turn, can be used in aquaculture for farming edible fish or crustaceans.

Aquaculture may take place in ponds, tanks, basins or else in segregated areas in the sea or in lakes, in particular in this case in cages or net pens. Aquaculture may be used for farming the finished edible fish, but also may be used for farming fry which are subsequently released so as to restock the wild fish stocks.

In salmon farming, the fish are preferably first grown into smolts in freshwater tanks or artificial watercourses and then grown on in cages or net pens which float in the sea and which are preferably anchored in bays or fjords.

Accordingly, the present invention also further provides a method for farming animals, in particular finfish or crustaceans, preferably salmon, in which a feedstuff according to the invention is employed. The present invention additionally further provides an animal, in particular a finfish or shellfish, which is obtainable by such a method according to the invention.

Processes for production of biomass, particularly that biomass which contains cells comprising lipids, particularly PUFAs, particularly from the order Thraustochytriales, are described extensively in the prior art. As a rule, the production takes place by cells being cultured in a fermenter in the presence of a carbon source and of a nitrogen source. In this context, biomass densities of more than 100 grams per litre and production rates of more than 0.5 gram of lipid per litre per hour may be attained. The process is preferably carried out as what is known as a fed-batch process, i.e. the carbon and nitrogen sources are fed in incrementally during the fermentation. Once the desired biomass has been obtained, lipid production may be induced by various measures, for example by limiting the nitrogen source, the carbon source or the oxygen content or combinations of these.

Preferably, the cells are fermented in a medium with low salinity, in particular so as to avoid corrosion. This can be achieved by employing chlorine-free sodium salts as the sodium source instead of sodium chloride, such as, for example, sodium sulphate, sodium carbonate, sodium hydrogen carbonate or soda ash. Preferably, chloride is employed in the fermentation in amounts of less than 3 g/l, in particular less than 500 mg/l, especially preferably less than 100 mg/l.

Suitable carbon sources are both alcoholic and non-alcoholic carbon sources. Examples of alcoholic carbon sources are methanol, ethanol and isopropanol. Examples of non-alcoholic carbon sources are fructose, glucose, sucrose, molasses, starch and corn syrup.

Suitable nitrogen sources are both inorganic and organic nitrogen sources. Examples of inorganic nitrogen sources are nitrates and ammonium salts, in particular ammonium sulphate and ammonium hydroxide. Examples of organic nitrogen sources are amino acids, in particular glutamate, and urea.

In addition, inorganic or organic phosphorus compounds and/or known growth-stimulating substances such as, for example, yeast extract or corn steep liquor, may also be added so as to have a positive effect on the fermentation.

The amount of sulphate added during fermentation is selected such that a sulphate content of 25 to 60 g/kg, in particular 25 to 50, 25 to 40 or 25 to 35 g/kg, with regard to the dry mass, ensues in the resulting biomass.

According to the invention, the sulphate content in the resulting biomass may be set in different ways.

For example, in what is known as a batch process, the required amount of sulphate may be initially charged in full right at the start. The amount of sulphate required can be easily calculated, since the cells used to form the biomass virtually completely assimilate the sulphate.

When using what is known as a fed-batch process, the amount of sulphate required may alternatively be metered in during the course of fermentation or, accordingly, some of the sulphate may be initially charged and the remainder metered in during the course of fermentation.

Especially when it emerges during the course of fermentation that the amount of biomass produced exceeds the originally calculated value, it is possible to ensure by subsequent metering-in of sulphate that the resulting biomass contains the required amount of sulphate.

The sulphate salt used is preferably sodium sulphate. The chloride content during fermentation is preferably less than 3 g/l, in particular less than 500 mg/l, especially preferably less than 100 mg/l. In addition to sulphates and any chlorides used, it is also optionally possible during fermentation to use further salts, especially those selected from sodium carbonate, sodium hydrogen carbonate, soda ash or inorganic phosphorus compounds. If further salts are used, these are preferably likewise each used in an amount of less than 3 g/l, in particular less than 500 mg/l, especially preferably less than 100 mg/l. The total salt content in the fermentation medium is preferably 15 to 25 g/l, in particular 17 to 21 g/l.

The sulphate salt used is preferably sodium sulphate, ammonium sulphate or magnesium sulphate and also mixtures thereof.

During fermentation, the chloride content is, with regard to the liquid fermentation medium including the biomass present, preferably always below 3 g/kg, in particular below 1 g/kg, especially preferably below 400 mg/kg of fermentation medium.

In addition to sulphates and any chlorides used, it is also optionally possible during fermentation to use further salts, especially those selected from sodium carbonate, sodium hydrogen carbonate, soda ash or inorganic phosphorus compounds.

If further salts are used, these are preferably used in an amount such that each one during fermentation, with regard to the liquid fermentation medium including the biomass present, is present in each case in an amount of less than 10 g/kg, in particular less than 5 g/kg, especially preferably less than 3 g/kg in the fermentation medium.

According to the invention, the total salt content in the fermentation medium including the biomass present is preferably always below 35 g/kg, in particular below 30 g/kg, during the course of the entire fermentation process. Especially preferably, the total salt content during the entire fermentation process, with regard to the liquid fermentation medium including the biomass present, is between 10 and 35 g/kg, in particular between 12 and 30 g/kg.

According to the invention, the sulphate content in the fermentation medium including the biomass present is preferably always between 5 and 16 g/kg during the course of the entire fermentation process.

According to the invention, "sulphate content" is to be understood to mean the total content of sulphate, i.e. the content of free and bound, in particular organically bound, sulphate. It can be assumed that the majority of the sulphate present in the biomass is present as a constituent of exopolysaccharides, which are involved in the formation of the cell wall of microorganisms.

According to the invention, the sulphate content is preferably determined by ascertaining the sulphur content of the biomass obtained, since the majority of the sulphur present in the biomass can be attributed to the sulphate present. Sulphur which can be attributed to other sources can be disregarded owing to the amount of sulphate present. Thus, the amount of sulphate present can be readily ascertained from the amount of sulphur ascertained.

In this connection, the sulphur content of the biomass is preferably determined by elemental analysis in accordance with DIN EN ISO 11885. For the analysis of the sulphur content of the biomass, appropriate aliquots of sample are disrupted preferably with nitric acid and hydrogen peroxide at 240° C. under pressure prior to the analysis in order to ensure the free accessibility of the sulphur present.

For the production of the feedstuff, it is therefore preferable according to the invention to use a PUFA-containing biomass which is distinguished by the fact that a sulphur content of 8 to 20 g/kg, based on the dry mass, can be detected therein by elemental analysis in accordance with DIN EN ISO 11885. In this connection, the sulphur content in the biomass is preferably 8 to 17 g/kg, in particular 8 to 14 g/kg, especially preferably 8 to 12 g/kg, based in each case on the dry mass.

According to the invention, the phosphorus content of biomasses used according to the invention is, with regard to the dry mass, preferably 1 to 6 g/kg, in particular 2 to 5 g/kg. The phosphorus content is preferably likewise ascertained by elemental analysis in accordance with DIN EN ISO 11885.

The cells are preferably fermented at a pH of 3 to 11, in particular 4 to 10, and preferably at a temperature of at least 20° C., in particular 20 to 40° C., especially preferably at least 30° C. A typical fermentation process takes up to approximately 100 hours.

According to the invention, the cells are preferably fermented up to a biomass density of at least 50, 60 or 70 g/l, in particular at least 80 or 90 g/l, especially preferably at least 100 g/l. In this case, the data are based on the content of dry biomass in relation to the total volume of the fermentation broth after the fermentation has ended. The content of dry biomass is determined by filtering-off of the biomass from the fermentation broth, subsequent washing with water, then complete drying—for example in a microwave—and lastly ascertainment of the dry weight.

After the fermentation has ended, the biomass is harvested. After harvesting the biomass or optionally even shortly before harvesting the biomass, the cells are preferably pasteurized in order to kill the cells and to inactivate enzymes which might promote lipid degradation. The pasteurization is preferably effected by heating the biomass to a temperature of 50 to 121° C. for a period of 5 to 60 minutes.

Likewise, after harvesting the biomass or optionally even shortly before harvesting the biomass, antioxidants are preferably added in order to protect the material of value present in the biomass from oxidative degradation. Preferred antioxidants in this context are BHT, BHA, TBHA, ethoxyquin, beta-carotene, vitamin E and vitamin C. The antioxidant, if used, is preferably added in an amount of 0.01 to 2% by weight.

Optionally, it is then possible before the actual drying to remove a portion of the fermentation medium from the biomass and to thus increase the solid fraction. This may be carried out in particular by centrifugation, flotation, filtration, particularly ultrafiltration or microfiltration, decanting and/or solvent evaporation. In this case, solvent evaporation is preferably carried out using a rotary evaporator, a thin-film evaporator or a falling-film evaporator in a single-stage or multistage process. Alternatively, reverse osmosis, for example, is also useful for concentrating the fermentation broth.

In this first optional but preferred step, the fermentation broth is preferably concentrated to a solids content of at least 10 or 15% by weight, preferably of at least 20 or 25% by weight, particularly 10 to 50 or 15 to 45% by weight, particularly preferably 15 to 40% by weight or 20 to 40% by weight.

This means that the biomass to be dried is preferably present in the form of a suspension having the solid fraction stated above, where the suspension is preferably a fermentation broth or concentrated fermentation broth.

After the optional concentration of the fermentation broth, the biomass is then dried, preferably by spray drying, particularly nozzle spray drying, spray granulation, fluidized bed granulation, or in a drum dryer.

Alternatively, the biomass may also be subjected to the drying step directly after harvesting without prior concentration, particularly if the fermentation broth obtained already has a high solids content, preferably as stated above.

On drying the biomass, this is preferably dried to a residual moisture content of at most 10% by weight, particularly 0 to 10% by weight, particularly preferably at most 8% by weight, particularly 0.5 to 8% by weight, above all at most 6 or 5% by weight, particularly 0.5 to 6 or 0.5 to 5% by weight.

According to the invention, "dry mass" is accordingly preferably to be understood to mean a product having a moisture content of below 10% by weight, in particular below 5% by weight. A free-flowing, fine-grained or coarse-grained product, preferably a granulate, is preferably obtained by the drying process. A product having the desired particle size can optionally be obtained from the granulate obtained by sieving or dust separation.

Providing a free-flowing, fine-grained powder was obtained, this can optionally be converted into a coarse-grained, free-flowing and largely dust-free product, which can be stored, by suitable compacting or granulating processes.

Conventional organic or inorganic auxiliaries or supports such as starch, gelatin, cellulose derivatives or similar substances, which are typically used in food processing or feed processing as binding agents, gelling agents or thickeners, may optionally be used in this subsequent granulation or compacting process.

"Free-flowing" according to the invention is understood to mean a powder that can flow out unhindered from a series of glass efflux vessels having different size outflow openings, at least from the vessel having the 5 millimetre opening (Klein: Seifen, Öle, Fette, Wachse 94, 12 (1968)).

"Fine-grained" according to the invention is understood to mean a powder having a predominant fraction (>50%) of particle sizes of 20 to 100 micrometres in diameter.

"Coarse-grained" according to the invention is understood to mean a powder having a predominant fraction (>50%) of particle sizes of 100 to 2500 micrometres in diameter.

"Dust-free" according to the invention is understood to mean a powder that contains only low fractions (<10%, preferably <5%) of particle sizes below 100 micrometres.

Particle sizes are preferably determined according to the invention by laser diffraction spectrometric methods. Possible methods are described in the textbook "Teilchengrößenmessung in der Laborpraxis" [Particle size measurement in the laboratory] by R. H. Müller and R. Schuhmann, Wssenschaftliche Verlagsgesellschaft Stuttgart (1996) and in the textbook "Introduction to Particle Technology" by M. Rhodes, Wiley & Sons (1998).

Inasmuch as various methods can be used, the first-cited usable method from the textbook by R. H. Müller and R. Schuhmann for the measuring of particle size is preferably used.

The biomass obtained by drying preferably has a fraction of at least 80% by weight, particularly at least 90% by weight, particularly preferably at least 95% by weight, of particles having a particle size of 100 to 3500 micrometres, preferably 100 to 3000 micrometres, above all 100 to 2500 micrometres.

WORKING EXAMPLES

Example 1: Producing Biomass by Fermentation of *Aurantiochytrium limacinum* SR21 in a Medium Having a High Sulphate Content and Subsequent Drying of the Biomass The cells were cultured for about 75 h in a feed process using a steel fermenter having a fermenter volume of 2 litres with a total starting mass of 712 g and an attained total final mass of 1.3-1.5 kg. During the process, a glucose solution (570 g/kg glucose) was metered in (fed-batch process).

The composition of the starting medium was as follows:
Medium 1: 20 g/kg glucose; 4 g/kg yeast extract; 16 g/kg sodium sulphate; 2 g/kg ammonium sulphate; 2.46 g/kg magnesium sulphate (heptahydrate); 0.45 g/kg potassium chloride; 4.5 g/kg potassium dihydrogen phosphate; 0.1 g/kg thiamine (HCl); 5 g/kg trace element solution.

The composition of the trace element solution was as follows: 35 g/kg hydrochloric acid (37%); 1.86 g/kg manganese chloride (tetrahydrate); 1.82 g/kg zinc sulphate (heptahydrate); 0.818 g/kg sodium EDTA; 0.29 g/kg boric acid; 0.24 g/kg sodium molybdate (dihydrate); 4.58 g/kg calcium chloride (dihydrate); 17.33 g/kg iron sulphate (heptahydrate); 0.15 g/kg copper chloride (dihydrate).

Culturing was carried out under the following conditions: Culture temperature 28° C.; aeration rate 0.5 vvm, stirrer speed 600-1950 rpm, control of pH in the growth phase at 4.5 using ammonia water (25% v/v). Fermentation was carried out up to a biomass density of 116 g/l.

After the culturing process, the fermentation broths were heated to 60° C. for 20 minutes in order to prevent further cellular activity.

This was followed by a two-stage drying of the biomass: Firstly, the fermentation broth was concentrated by evaporation to a dry mass of about 20% by weight. This was followed by spray drying of the concentrated fermentation broth using a Production Minor™ spray dryer (GEA NIRO) at a drying air inlet temperature of 340° C. By means of spray drying, a powder having a dry mass of more than 95% by weight was thus obtained.

The sulphate content of the biomass obtained was determined by determining the sulphur content of the biomass in accordance with DIN ISO 11885. To this end, an aliquot of the biomass was firstly disrupted under pressure at 240° C. with nitric acid and hydrogen peroxide. The sulphur content ascertained was 11 g/kg of biomass, corresponding to a sulphate content of 33 g/kg of biomass.

Example 2: Producing the Feedstuff by Extrusion

The feedstuff mixtures shown in Table 1 were produced. Besides the biomass to be used according to the invention as per Example 1, two further commercially available Labyrinthulea biomasses and also fish oil as a currently still customary source of omega-3 fatty acids were tested for comparison.

The feedstuff mixtures were each produced by mixing of the components—with the exception of the oils—using a double-helix mixer (model 500L, TGC Extrusion, France). The mixtures thus obtained were then comminuted to particle sizes below 250 μm using a hammer mill (model SH1, Hosokawa-Alpine, Germany).

TABLE 1

Feedstuff compositions used in the extrusion process (data in % by weight)

| Ingredient | M1 | M2 | M3 | M4 |
| --- | --- | --- | --- | --- |
| Fish meal | 10.00 | 10.00 | 10.00 | 10.00 |
| Soya protein concentrate | 23.10 | 23.20 | 23.10 | 20.27 |
| Pea protein concentrate | 15.00 | 15.00 | 15.00 | 15.00 |
| Wheat gluten | 9.90 | 9.90 | 9.90 | 9.90 |
| Wheat meal | 18.12 | 10.82 | 10.55 | 16.46 |
| Fish oil | 10.00 | — | — | — |
| Biomass from Example 1 | — | 16.00 | — | — |
| Commercially available biomass 1 | — | — | 16.74 | — |
| Commercially available biomass 2 | — | — | — | 13.52 |
| Rape oil | 10.00 | 11.00 | 11.00 | 11.00 |
| Vitamin/mineral premix | 1.00 | 1.00 | 1.00 | 1.00 |
| DCP | 2.00 | 2.00 | 2.00 | 2.00 |
| Yttrium oxide | 0.03 | 0.03 | 0.03 | 0.03 |
| DL-Methionine | 0.35 | 0.36 | 0.33 | 0.33 |
| Aquavi Lys | 0.17 | 0.35 | 0.08 | 0.19 |
| TrypAmino | 0.09 | 0.09 | 0.08 | 0.09 |
| L-Histidine | 0.24 | 0.25 | 0.19 | 0.21 |

For the extrusion process, use was made in each case of 140 kg per feedstuff. The extrusion process was carried out using a twin-screw extruder (CLEXTRAL BC45) having a screw diameter of 55.5 mm and a maximum flow rate of 90-100 kg/h. Pellets of 4.0 mm in size (diameter and length) were extruded. To this end, the extruder was equipped with a high-speed cutter in order to convert the product to the intended pellet size.

Various extrusion parameters were then tested in order to find out under what extrusion conditions it is possible to obtain an optimal oil load capacity of the extrudate obtained. In this connection, it became apparent that, surprisingly, an optimal oil load capacity can be achieved with a very low energy input. In this connection, the energy input was distinctly lower than when using fish oil. Furthermore, the optimal energy input in the case of a Thraustochytrium biomass to be preferably used according to the invention was again distinctly lower than in the case of commercially available Thraustochytrium biomasses. The results are shown in Table 2.

TABLE 2

Energy inputs relating to producing pellets having the desired oil load capacity

| Diet | Barrel 1 Temp (° C.) | Barrel 2 Temp (° C.) | Feeder rate (kg/h) | Rotational speed (rpm) | Amount of water (0-10) | Current (A) | SME (Wh/kg) |
| --- | --- | --- | --- | --- | --- | --- | --- |
| M1 | 31 | 116-118 | 112 | 215 | 9 | 11 | 34.6 |
| M2 | 32 | 98-104 | 141 | 253 | 5 | 7 | 20.6 |
| M3 | 32 | 97-102 | 136 | 255 | 5 | 8 | 24.6 |
| M4 | 31 | 99-107 | 133 | 253 | 5 | 8 | 24.9 |

In this connection, the variable "SME" is the specific mechanical energy. This is calculated as follows:

$$SME(W\,h/kg) = \frac{U \times I \times \cos\Phi \frac{\text{Test } SS}{\text{Max } SS}}{Q_S}$$

where
U: operating voltage of the motor (here 460 V)
I: current of the motor (A)
cos φ: theoretical performance of the extruder motor (here 0.95)
Test SS: test speed (rpm) of the rotating screws
Max SS: maximum speed (267 rpm) of the rotating screws
$Q_S$: inlet flow rate of the mash (kg/h)

After extrusion, the extrudate was dried in a vibrating fluidized bed dryer (model DR100, TGC Extrusion, France).

This was followed, after the extrudate had cooled down, by oil coating by means of vacuum coating (vacuum coater PG-10VCLAB, Dinnisen, the Netherlands).

Example 3: Ascertaining Abrasion Resistance and Water Stability

Abrasion resistance was ascertained as follows: Before being loaded with oil, the dried extrusion product was exposed to a mechanical load using the Holmen pellet tester (Borregaard Lignotech, Hull, UK). Before carrying out the test, the samples were screened in order to remove any adherent fine particles. The processed samples (100 g) were subsequently introduced into the pellet tester using a 2.5 mm filter screen. The pellets were subsequently conveyed through a pipe having right-angled pipe bends at high air velocity for 30 seconds. Subsequently, abrasion was determined by weighing. Abrasion resistance was specified as PDI (Pellet Durability Index), defined as the amount in percent of sample remaining in the filter screen. The test was carried out with three samples and then the mean was determined.

Water stability was carried out using the oil-loaded samples. The method was essentially carried out as described by Baeverfjord et al. (2006; Aquaculture 261, 1335-1345), with slight modifications. 10 g samples were introduced into metallic infusion baskets having a mesh size of 0.3 mm. The infusion baskets were subsequently introduced into a plastic trough containing water, and so the samples were completely covered with water. The trough was subsequently exposed for 30 minutes to a shake-agitation of 30 shake units per minute. Thereafter, the samples were carefully dried with blotting paper and then weighed before and after they had been subjected to oven drying at a temperature of 105° C. for 24 hours. Water stability was calculated as the difference in the dry weight of the sample before and after the incubation in water and specified in percent of the dry weight of the sample used before the incubation with water.

The results are shown in Table 3.

| Sample | M1 | M2 | M3 | M4 |
| --- | --- | --- | --- | --- |
| Abrasion resistance [%] | 90.0 | 93.3 | 88.3 | 85.2 |
| Water stability [%] | 95.7 | 98.5 | 93.8 | 90.2 |

It can be seen that a feedstuff according to the invention has a distinctly higher abrasion resistance and water stability than feedstuffs which contain a commercially available Labyrinthulea biomass or fish oil as a source of omega-3 fatty acids.

The invention claimed is:

1. A PUFA (polyunsaturated fatty acid)-containing feedstuff, comprising 2 to 22% by weight of dry biomass, wherein:
   a) said biomass is obtained by the fermentation of Labyrinthulea cells;
   b) said biomass comprises 25-60 g/kg of sulphate by weight of dry biomass;
   c) the 25-60 g/kg of sulphate in said dry biomass is from sulphate present during the fermentation of said Labyrinthulea cells;
   and wherein the PUFA-containing feedstuff is characterized by an abrasion resistance, based on its Pellet Durability Index (PDI), of at least 91% and a water stability of at least 96%.

2. The PUFA-containing feedstuff of claim 1, wherein the Labyrinthulea cells are in the family Thraustochytriaceae.

3. The PUFA-containing feedstuff of claim 2, wherein said feedstuff contains biomass in an amount of 9 to 20% by weight.

4. The PUFA-containing feedstuff of claim 2, wherein the Labyrinthulea cells in the family Thraustochytriaceae are of the species *Schizochytrium* or *Aurantiochytrium*.

5. The PUFA-containing feedstuff of claim 1, and wherein said feedstuff is coated with oil in an amount of 3-18% by weight.

6. The PUFA-containing feedstuff of claim 5, wherein said feedstuff is coated with 7-13% by weight of a coating that is a vegetable oil.

7. The PUFA-containing feedstuff of claim 1, wherein the Labyrinthulea biomass is present in an amount of 11-18% by weight.

8. The PUFA-containing feedstuff of claim 1, wherein the Labyrinthulea biomass is present in an amount of 4 to 20% by weight and said feedstuff is coated with oil in an amount of 5-15% by weight.

9. The PUFA-containing feedstuff of claim 1, wherein the abrasion resistance is at least 94%.

10. The PUFA-containing feedstuff of claim 9, wherein the water stability is at least 98%.

11. The PUFA-containing feedstuff of claim 1, wherein the water stability is at least 98%.

12. The PUFA-containing feedstuff of claim 1, further comprising one or more of the following:
    a) a polyunsaturated fatty acid (PUFA) content of 0.8 to 8% by weight;
    b) an omega-3 fatty acid content of 0.8 to 8% by weight; and
    c) a DHA content of 0.1 to 4.0% by weight.

13. The PUFA-containing feedstuff of claim 1, comprising the following properties:
    a) a total protein content of 33 to 67% by weight;
    b) a total fat content of 5 to 25% by weight;
    c) a total starch content of at most 25% by weight; and
    wherein the PUFA-containing feedstuff of claim 1, further comprises one or more of the following:
    e) a polyunsaturated fatty acid (PUFA) content of 0.8 to 8% by weight;
    f) an omega-3 fatty acid content of 0.8 to 8% by weight; and/or
    g) a DHA content of 0.1 to 4.0% by weight.

14. The PUFA-containing feedstuff of claim 1, wherein said biomass comprises 25-40 g/kg of sulphate by weight of dry biomass.

15. A process for producing the PUFA-containing feedstuff of claim 1, wherein said process comprises extruding a PUFA-containing biomass having a sulphate content of 25 to 60 g per kilogram of biomass together with other feedstuff components.

16. The process of claim 15, wherein the extrudate is dried and then loaded with oil.

17. The process of claim 16, wherein extrusion and drying is followed by coating of the extrudate with oil in an amount of 3 to 17% by weight.

18. The process of claim 15, wherein the extrusion is carried out at an energy input of 12-28 Wh/kg.

19. The process of claim 15, wherein the composition used for extrusion comprises:
   a) a total protein content of 33 to 67% by weight;
   b) a total fat content of 5 to 25% by weight;
   c) a total starch content of at most 25% by weight.

20. The process of claim 19, wherein the composition used for extrusion further comprises one or more of the following:
   e) a PUFA content of 0.8 to 8% by weight;
   f) an omega-3 fatty acid content of 0.8 to 8% by weight;
   g) a DHA content of 0.1 to 4.0% by weight.

21. A method for farming animals comprising feeding said animals the PUFA-containing feedstuff of claim 1.

\* \* \* \* \*